United States Patent
Normark et al.

(10) Patent No.: US 8,180,000 B2
(45) Date of Patent: May 15, 2012

(54) GNSS RECEIVER

(75) Inventors: Per-Ludvig Normark, Stockholm (SE); Alexander Mitelman, Stockholm (SE)

(73) Assignee: NordNav Technologies AB, Stockholm (SE)

( * ) Notice: Subject to any disclaimer, the term of this patent is extended or adjusted under 35 U.S.C. 154(b) by 256 days.

(21) Appl. No.: 12/663,620

(22) PCT Filed: Jun. 12, 2007

(86) PCT No.: PCT/SE2007/050410
§ 371 (c)(1),
(2), (4) Date: Dec. 8, 2009

(87) PCT Pub. No.: WO2008/153457
PCT Pub. Date: Dec. 18, 2008

(65) Prior Publication Data
US 2010/0177806 A1    Jul. 15, 2010

(51) Int. Cl.
*H04L 27/06* (2006.01)
*H03D 1/00* (2006.01)

(52) U.S. Cl. ........ 375/340; 375/346; 375/343; 375/349; 375/147; 375/149; 455/9; 455/12.1; 455/13.2; 370/314; 370/342; 370/441

(58) Field of Classification Search .................. 375/340, 375/346, 343, 349, 145, 142, 150, 149, 316; 455/9, 12.1, 13.2; 370/314, 342, 441
See application file for complete search history.

(56) References Cited

U.S. PATENT DOCUMENTS

| | | | |
|---|---|---|---|
| 6,009,118 A * | 12/1999 | Tiemann et al. | 375/150 |
| 6,208,291 B1 | 3/2001 | Krasner | |
| 7,848,217 B2 * | 12/2010 | Stahlberg et al. | 370/207 |
| 2002/0004392 A1 * | 1/2002 | Farine et al. | 455/427 |
| 2003/0147457 A1 * | 8/2003 | King et al. | 375/148 |
| 2006/0022868 A1 | 2/2006 | Awata | |
| 2006/0082500 A1 | 4/2006 | Pitt et al. | |
| 2006/0152409 A1 | 7/2006 | Raman et al. | |
| 2007/0237269 A1 * | 10/2007 | Lillo et al. | 375/343 |
| 2009/0258657 A1 * | 10/2009 | Tanaka et al. | 455/456.1 |
| 2010/0046589 A1 * | 2/2010 | Douglas | 375/150 |

OTHER PUBLICATIONS

Marc Weiss, Position Location Using Sequential GPS Measurements, pp. 275-278, In: PLANS '82—Position Location and Navigation Symposium, Atlantic City, NJ Dec. 6-9, 1982, Record (A84-12426 02-04). New York, Institute of Electrical and Electronics Engineers, 1982.

* cited by examiner

*Primary Examiner* — Phuong Phu
(74) *Attorney, Agent, or Firm* — Downs Rachlin Martin PLLC

(57) ABSTRACT

A GNSS receiver including a processing unit adapted to process radio signals transmitted from an active set of signal sources and based thereon produce position/time related data. The signals of the active set are processed in parallel with respect to a real-time signal data rate of the signals by a respective tracking channel resource allocated for each signal source. The processing unit also has a monitoring channel resource adapted to process radio signals transmitted from each of at least two signal sources in an additional set of signal sources different from the signal sources in the active set. The processing unit is adapted to process the radio signals of the additional set according to a cyclic processing sequence such that the signals from any of the signal sources in the additional set can be included into a navigation solution without delay.

25 Claims, 3 Drawing Sheets

| T1 | T2 | T3 | T4 | T5 | T6 | M |
|---|---|---|---|---|---|---|
| -- | -- | -- | -- | -- | -- | -- | t = 0

| T1 | T2 | T3 | T4 | T5 | T6 | M |
|---|---|---|---|---|---|---|
| SV1 | SV2 | SV3 | SV4 | -- | -- | -- | t = $t_1$

| T1 | T2 | T3 | T4 | T5 | T6 | M |
|---|---|---|---|---|---|---|
| SV1 | SV2 | SV3 | SV4 | SV5 | SV6 | SV7 | t = $t_2$

| T1 | T2 | T3 | T4 | T5 | T6 | M |
|---|---|---|---|---|---|---|
| SV1 | SV2 | SV3 | SV4 | SV8 | SV8 | SV10 | t = $t_3$

| T1 | T2 | T3 | T4 | T5 | T6 | M |
|---|---|---|---|---|---|---|
| SV1 | SV2 | SV3 | SV4 | SV8 | SV9 | SV5 | ph1 t > $t_4$

| | |
|---|---|
| SV6 | ph2 |
| SV7 | ph3 |
| SV10 | ph4 |

σ

310 —

| SV ID | P1 | P2 | ... | Pn |
|---|---|---|---|---|
| SV1 | | | | : |
| : | | ... | | |
| SV9 | | ... | | |
| SV5 | | ... | | |
| : | | ... | | |
| SV10 | ... | | | |

$s_{act}$ $s_{add}$

Fig. 3

GNSS RECEIVER

THE BACKGROUND OF THE INVENTION AND PRIOR ART

The present invention relates generally to reception and processing of spread spectrum signals in Global Navigation Satellite System (GNSS) receivers. More particularly the invention relates to a receiver according to the preamble of claim 1 and a method according to the preamble of claim 13. The invention also relates to a computer program according to claim 24 and a computer readable medium according to claim 25.

Many examples of GNSSs exist. Presently, the Global Positioning System (GPS; U.S. Government) is the dominant system, however alternative systems are expected to gain increased importance in the future. So far, the Global Orbiting Navigation Satellite System (GLONASS; Russian Federation Ministry of Defense) and the Galileo system (the European programme for global navigation services) constitute the major alternative GNSSs. Various systems also exist for enhancing the coverage, the availability and/or the quality of at least one GNSS in a specific region. The Quasi-Zenith Satellite System (QZSS; Advanced Space Business Corporation in Japan), the Wide Area Augmentation System (WAAS; The U.S. Federal Aviation Administration and the Department of Transportation) and the European Geostationary Navigation Overlay Service (EGNOS; a joint project of the European Space Agency, the European Commission and Eurocontrol—the European Organisation for the Safety of Air Navigation) represent examples of such augmentation systems for GPS, and in the latter case GPS and GLONASS.

The hardware constraints of first generation of GPS receivers were such that these devices processed satellite signals by means of a single channel. In the early designs, the receiver operated sequentially to determine a geographical coordinate based on several satellite signals. M. Weiss describes one example of such a receiver design in PLANS '82—Position Location and Navigation Symposium, Atlantic City, N.J., Dec. 6-9, 1982, Record (A84-12426 02-04). New York, Institute of Electrical and Electronics Engineers, 1982, p. 275-278.

By comparison, all modern GPS receivers employ parallel tracking, for example having 12 channels. This means that the receiver has dedicated hardware to receive 12 channels simultaneously. Typically, this decreases the expected time to identify and acquire the signals from a sufficient number of satellites compared to a single-channel receiver. The parallel receiver also has improved reliability and accuracy.

Furthermore, there exist various forms of hybrid receivers in the form of multiplexing receivers. This type of receiver uses relatively few receiver modules to time division multiplex among the satellites that are currently in view. Hence, the receiver gathers data from one satellite during a first time slot, and then during a second time slot, switches to another satellite to gather more data. Provided that the switching is effected sufficiently fast, the receiver appears to be tracking all of the satellites simultaneously.

Whatever the type of receiver, GNSS navigation can be highly challenging in some radio environments, particularly when the characteristics of these environments are rapidly varying. By design, the signal sources (i.e. the satellites) move across the sky with varying trajectories and elevations depending on the receiver's position relative to the signal sources in question. Moreover, the receiver itself and/or objects between the receiver and one or more of the signal sources may be repositioned, and thus drastically alter the radio conditions. Occasionally, the signals from one or more signal sources may be completely blocked with no prior warning or indication thereof, for example if the receiver passes a corner of a high building. Due to the changeable radio conditions, the set of radio signals based upon which the receiver produces position/time related data must be refreshed repeatedly. However, effecting this updating is not a trivial task, especially not if the available time is short. Namely, in order to include any recently unobscured signals in the navigation solution, a so-called rapid acquisition process with respect to these signals must be completed to determine the data necessary to track them continuously. Failure to re-acquire the tracking data quickly enough may force the receiver to perform conventional re-acquisition or even full acquisition, which consumes significant power and can cause a severe disruption in the production of the position/time related data.

SUMMARY OF THE INVENTION

The object of the present invention is to alleviate the above problems and provide a power-efficient solution for producing position/time related data based on a set of received signals, where the set is adapted to be optimal with respect to at least one given selection criterion.

According to the invention, the object is achieved by the GNSS receiver as initially described, wherein the processing unit includes at least one monitoring channel resource adapted to process radio signals transmitted from each of at least two signal sources in an additional set of signal sources different from the signal sources in the active set. The processing unit is further adapted to process the radio signals from the signal sources in the additional set according to a cyclic processing sequence involving the following: processing signals from a first additional signal source during a first phase of the sequence; processing signals from at least one second additional signal source during at least one second phase of the sequence; and determining in each of said phases a respective set of parameters regarding the radio signals received from one signal source in the additional set. The set of parameters at least includes tracking-parameter data.

This receiver design is advantageous because it maintains updated tracking data as well as an updated basis for performing informed selection decisions in respect of potential future signal sources at a relatively low cost in terms of processing resources. Hence, if deemed advantageous, the signals from the sources in the additional set can be included in the navigation solution at any time, either as a complement to, or as a replacement of, one or more signals already included in the navigation solution.

According to one preferred embodiment of the invention, the set of parameters regarding the radio signals received from one signal source in the additional set also includes a signal-to-noise estimate. This facilitates the process of making appropriate selection decisions.

According to yet another preferred embodiment of the invention, the tracking-parameter data for each signal source in the additional set includes a code-phase measure relating to an offset of a spreading code characterizing the signal source. The tracking-parameter data also includes a Doppler frequency estimate expressing a shift from a nominal carrier frequency for each satellite signal and a code phase estimate, expressing a relationship between a phase of the modulation signal received from each observed satellite and a locally generated reference copy of that same modulation signal. This tracking-parameter data render it possible to include any signal source from the additional set in the active set at any time, and continue to produce the position/time related data based on the thus included signal source without any delay or disruption.

According to another preferred embodiment of the invention, the processing unit is adapted to transfer a first number of signal sources from the additional set to the active set. The processing unit is further adapted to transfer the first number of signal sources from the active set to the additional set, such that the number of signal sources in the active set remains constant. For accuracy reasons it is generally desirable to maintain the active set as large as possible given the available tracking channel resources. However, to economize the processing resources a smaller active set is sometimes preferable. Therefore, the number of signal sources transferred to the active set need not always be equal to the number of signal sources transferred therefrom.

According to a further preferred embodiment of the invention, the processing unit is adapted to effect the transfer of signal sources between the active and additional sets in response to a replacement request from a process being external to the processing of the tracking channel resources.

For example, the replacement request may be based on an estimated processing power required to produce the position/time related data based on the radio signals received from the signal sources in the active set and based on the signal sources in the in the additional set respectively, such that a replacement request is generated which is expected to make better use of the available processing power.

Alternatively, the replacement request may be based on at least one geometry parameter reflecting a spatial position of each of the signal sources in the active set and each of the signal sources in the in the additional set. Hence, so-called DOP (Geometric Dilution of Precision) considerations, which quantify the effects of the relative position of all signal sources on the accuracy of a position fix computer from them, can be weighed into the replacement request. Thus, the active set can be updated in order to improve the expected positioning accuracy.

Furthermore, the replacement request may be based on a position constraint specifying a lowest acceptable accuracy of the position/time related data produced based on the signals received from the signal sources in the active set. Hence, if the signal sources of the current active set provide an unsatisfying data accuracy and an alternative active set including one or more signal sources from the additional set is expected to provide an acceptable data accuracy, a relevant replacement request will be issued.

Finally, a discontinuity in the reception of radio signals from at least one of the signal sources in the active set, or a tracking failure in respect of at least one signal received therefrom may cause generation of a replacement request, which aims at resolving this problem.

According to still another preferred embodiment of the invention, the receiver includes a signal-source record over the signal sources in the active and the additional sets respectively. The signal-source record, in turn, specifies for each signal source the tracking parameter data, the signal-to-noise estimate, and ephemeris data describing the source's movements over time relative to Earth. Moreover, the processing unit is adapted to repeatedly update the tracking-parameter data (e.g. including Doppler frequency estimate(s) and code phase estimate(s)), the signal-to-noise estimate and the ephemeris data based on radio signals received from the signal sources in the active set. The processing unit is likewise adapted to repeatedly update the tracking-parameter data and the signal-to-noise estimate based on radio signals received from the signal sources in the additional set. Thereby, a solid basis is created for generating well-founded replacement requests.

Alternatively, the processing unit is adapted to repeatedly update the tracking-parameter data and/or the ephemeris data for at least one aided signal source in the active or additional sets based on radio signals received from an aiding transmitter different from any of the signal sources in the active or additional sets; and to repeatedly update the tracking-parameter data and ephemeris data for each signal source other than the at least one aided signal source based on radio signals received from the signal sources in the active and additional sets. Consequently, the design becomes less dependent on constant signal reception from the satellites.

According to another preferred embodiment of the invention, the processing unit is adapted to determine at repeated instances, for each signal source in the additional set, an ephemeris age since the ephemeris data relating to the signal source were issued. For example, the ephemeris age can be determined based on an issue of data ephemeris (IODE). If the ephemeris age exceeds a threshold value, the processing unit is adapted to cause generation of a replacement request specifying inclusion into the active of each signal source from the additional set whose ephemeris age exceeds the threshold value. Thereby, it can be safeguarded that sufficiently fresh ephemeris data is maintained for all satellites in view from the receiver.

According to yet another preferred embodiment of the invention, it is presumed that at least one of the signal sources in the additional set transmits radio signals in a secondary frequency band being different from a main frequency band in which radio signals from the signal sources in the active set are received by the receiver. The processing unit is further adapted to measure a transmission parameter reflecting an ionospheric delay between the signal sources and the receiver based on at least one radio signal received in the main frequency band from at least one signal source in the active set and based on at least one radio signal received in the secondary frequency band from the at least one signal source in the additional set.

According to still another preferred embodiment of the invention, it is likewise presumed that at least one of the signal sources in the in the additional set transmits radio signals in a secondary frequency band being different from a main frequency band in which radio signals from the signal sources in the in the active set are received by the receiver. Here, however, the processing unit is adapted to resolve real time-kinematics (RTK) related carrier ambiguities based on at least one radio signal received in the main frequency band from at least one signal source in the active set and at least one radio signal received in the secondary frequency band from the at least one signal source in the additional set.

In both the above-described embodiments it is assumed that a given satellite may include equipment for transmitting signals on more than one frequency band. Hence, it is possible that a first signal transmitted on a first frequency band from such a multi-band satellite is included in the active set while a second signal transmitted on a second frequency band is included in the additional set.

According to a further preferred embodiment of the invention, the signal processing unit is at least partly implemented in software running on a processor. Thus, a large degree of freedom is provided, for example with respect to the number of channel resources for the active and additional sets allocated at different times.

According to another aspect of the invention the object is achieved by the method described initially, wherein the method includes processing radio signals transmitted from each of at least two signal sources in an additional set of signal sources, different from the signal sources in the active set, according to a cyclic processing sequence. This processing is effected in at least one monitoring channel resource and involves processing signals from a first additional signal source during a first phase of the sequence. Signals from at least one second additional signal source are processed during at least one second phase of the sequence. In each of said phases a respective set of parameters are determined regarding the radio signals received from one of the signal sources in the additional set. The set of parameters includes tracking-parameter data and a signal-to-noise estimate.

The advantages of this method, as well as the preferred embodiments thereof, are apparent from the discussion above with reference to the proposed receiver.

According to a further aspect of the invention the object is achieved by a computer program, which is directly loadable into the memory of a computer, and includes software adapted to implement the method proposed above when said program is run on a computer.

According to another aspect of the invention the object is achieved by a computer readable medium, having a program recorded thereon, where the program is to control a computer to perform the method proposed above when the program is loaded into the computer.

Further advantages, beneficial features and applications of the present invention will be apparent from the following description and the dependent claims.

BRIEF DESCRIPTION OF THE DRAWINGS

The present invention is now to be explained more closely by means of preferred embodiments, which are disclosed as examples, and with reference to the attached drawings.

FIG. 3 illustrates how a number of signal sources are acquired and included into the proposed active and additional sets of signal sources according to one embodiment of the invention.

DESCRIPTION OF PREFERRED
EMBODIMENTS OF THE INVENTION

Figure 1:
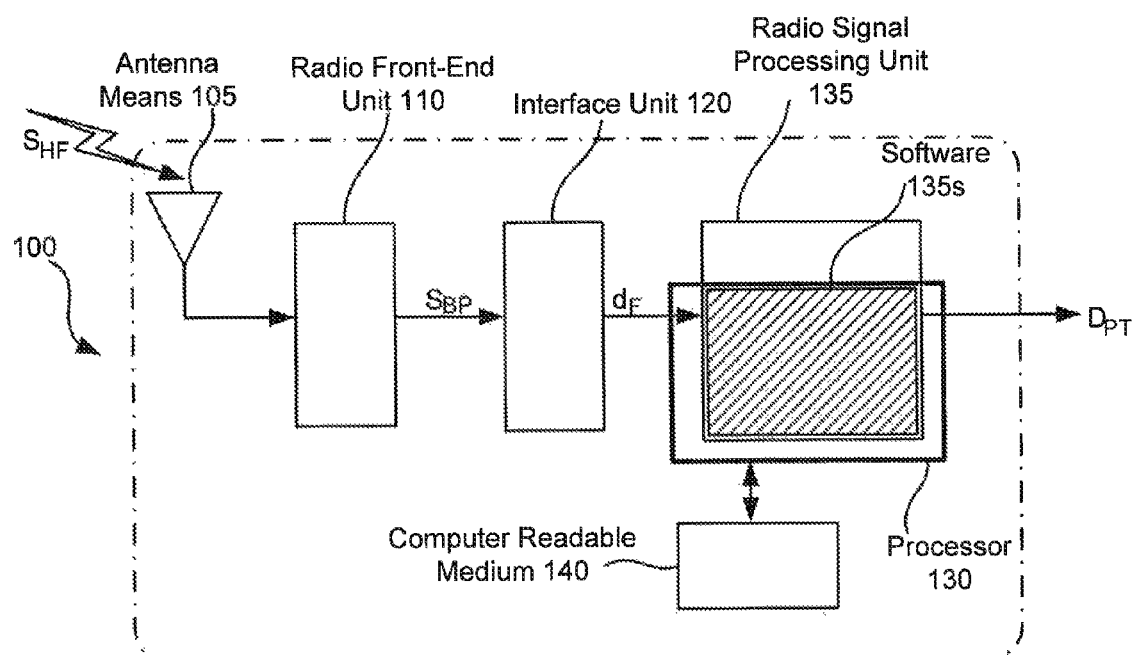
FIG. 1 shows a block diagram of a GNSS receiver according to one embodiment of the invention.

FIG. 1 shows a block diagram of a GNSS receiver 100 according to one embodiment of the invention. The receiver 100 includes a radio front-end unit 110, an interface unit 120 and a radio signal processing unit 135. The receiver 100 preferably also includes a computer readable medium 140, such as a memory buffer, storing a program which is adapted to control the processing unit 135 to operate according to the proposed principle.

The radio front-end unit 110 has an antenna means 105 adapted to receive radio signals $S_{HF}$ from a plurality of signal sources, for example a set of satellites belonging to one or more GNSSs. To this aim the antenna means 105 is designed to receive radio frequency signals in at least one frequency band, e.g. the L1-, L2- and/or L5/E5a-bands, i.e. having spectra ranging from 1563 MHz to 1587 MHz, 1215 MHz to 1240 MHz and 1155 MHz to 1197 MHz respectively. Furthermore, the radio front-end unit 110 is adapted to perform downconversion, sampling and digitizing of the received radio signals $S_{HF}$, and to produce a resulting digital representation $S_{BP}$, based on which the radio signal processing unit 135 can perform relevant further signal processing to generate position/time related data $D_{PT}$. For example, the unit 110 may directly sample a bandpass version of the radio signals $S_{HF}$, or the unit 110 may execute I/Q bandpass sampling, and thus frequency downconvert the received signals $S_{HF}$ to the baseband.

The interface unit 120 is adapted to interconnect the radio front-end unit 110 with the radio signal processing unit 135 by converting the digital representation $S_{BP}$ from the radio front-end unit 110 to a data format $d_F$ being suitable for handling by the radio signal processing unit 135.

Preferably, the radio signal processing unit 135 is at least partly implemented in software 135s running on a processor 130. In fact, according to embodiments of the invention, the radio signal processing unit 135 may be entirely implemented in the software 135s. However it is also feasible that one or more separate units, e.g. realized in an FPGA (Field Programmable Gate Array) design or an ASIC, are adapted to perform at least one of the unit's 135 processing functions.

In any case, according to the invention, the radio signal processing unit 135 is adapted to process radio signals $S_{HF}$ transmitted from an active set of signal sources and based thereon produce the position/time related data $D_{PT}$. The signals $S_{HF}$ received from the signal sources in the active set are processed in parallel with respect to a real-time signal data rate of the signals by a set of respective tracking channel resources, one allocated for each signal source. In other words, this means that the data $D_{PT}$ is produced at a nominal system rate based on the active-set signals. The processing unit 135 also includes at least one monitoring channel resource adapted to process radio signals $S_{HF}$ transmitted from each of at least two signal sources in an additional set of signal sources different from the signal sources in the active set. The processing unit 135 is adapted to process the radio signals $S_{HF}$ from the signal sources in the additional set according to a cyclic processing sequence that involves: processing signals from a first additional signal source during a first phase of the sequence; processing signals from at least one second additional signal source during at least one second phase of the sequence; and determining in each of said phases a respective set of parameters regarding the radio signals $S_{HF}$ received from one signal source in the additional set. The set of thus determined parameters includes tracking-parameter data. Preferably, however not necessarily, the set of parameters also includes a signal-to-noise estimate. It is worth mentioning that although the position/time related data $D_{PT}$ is nominally produced at least based on the radio signals $S_{HF}$ transmitted from the active set, it is not technically excluded that one or more of the radio signals $S_{HF}$ transmitted from signal sources in the additional set also be used to produce such data $D_{PT}$.

Figure 2:
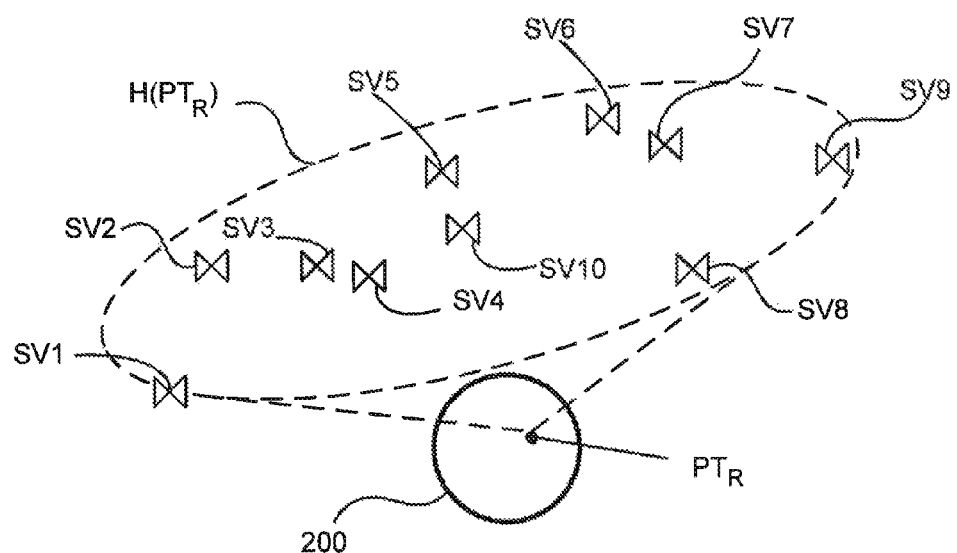
FIG. 2 shows a group of signal sources being visible from a particular receiver position.

The above-mentioned set of parameters, as well as the operation of the processing unit 135 in respect of the active and additional sets, will be explained in further detail below with reference to FIG. 3. First, however, we refer to FIG. 2 to discuss the basis for the active and additional sets. FIG. 2 shows a group of GNSS signal sources SV1, SV2, SV3, SV4, SV5, SV6, SV7, SV8, SV9 and SV10 included in satellites that are assumed to be visible from a particular receiver position at a particular instant, i.e. at a given position/time $PT_R$. Here, a visibility limit $H(PT_R)$ is schematically specified as the horizon seen from the position/time $PT_R$. To avoid excessive multipath errors, it is normally preferable if the receiver also applies an elevation mask angle, e.g. equivalent to 5° elevation above the horizon, below which signal sources are deemed to be unreliable.

A tentative group of potential signal sources may be derived from an almanac in the receiver. The almanac describes the satellites' movements over time. Alternatively, or as a complement thereto, the tentative group can be derived from broadcast ephemeris data and/or one or more assisted GNSS services available to the receiver. Normally, the ephemeris data is associated with an IODE parameter, which indicates how old the information is. Depending on the time span since the most recent update of the receiver's position and/or time references, the expected composition of the tentative group and the expected positions of each member in said group may be imperfect or incorrect.

Referring now to FIG. 3, we will explain how the signal sources SV1, SV2, SV3, SV4, SV5, SV6, SV7, SV8, SV9 and SV10 illustrated in FIG. 2 may be acquired and included into the proposed active and additional sets of signal sources according to one embodiment of the invention.

As mentioned above, the radio signal processing unit 135 is adapted to process radio signals $S_{HF}$ transmitted from signal sources, which are categorized as belonging to either an active set or an additional set. Here, the active set has precedence, such that the processing unit 135 produces position/time related data $D_{PT}$ based on the signals of the active set, whereas the signals transmitted from the signal sources in the additional set does not nominally result in position/time related data $D_{PT}$. Nevertheless, the processing unit 135 derives tracking-parameter data, and preferably signal-to-noise estimates with respect to the signals of the additional set.

The signals of the active set are processed in parallel with respect to a real-time signal data rate of the signals by a respective tracking channel resource allocated for each signal source in the active set. In this example, the processing unit 135 has six such tracking channel resources that are denoted T1, T2, T3, T4, T5 and T6 in FIG. 3. Preferably, the processing capacity allocated to handle the tracking channel resources is adaptive, and thus the number of tracking channel resources is variable, for example in response to an amount of processing resources presently available for performing GNSS-related computations. Moreover, the processing unit 135 has at least one monitoring channel resource, which is adapted to process radio signals $S_{HF}$ transmitted from each signal source in the additional set. In the example illustrated in FIG. 3, one monitoring channel resource M is allocated. In contrast to the active set, the signals of the additional set are processed according to a cyclic processing sequence in a TDMA-like manner, which means that a resulting data rate is lower than what is normally necessary to enable real-time production of position/time related data $D_{PT}$.

As will be elaborated upon below, the concept of tracking channel resources and monitoring channel resources only becomes meaningful if the number of signal sources in the additional set exceeds the allocated number of monitoring channel resources M. Furthermore, the active set is defined, such that the number of signal sources therein is equal to the number of tracking channel resources T1, T2, T3, T4, T5 and 16. Below follows an illustrating example, which refers to FIG. 3.

At an initial point in time t=0, we assume that the GNSS receiver 100 is powered up (or by other means is operated such that it gains access to a radio environment in which signals from a plurality of sources are available at the antenna means 105). At t=0, we further assume that the receiver 100 lacks complete knowledge about the specific signal sources from which signals can be received. Therefore, all the processing unit's 135 processing resources T1, T2, T3, T4, T5, T6 and M are blank/free.

Gradually, however, as the receiver's 100 acquisition process progress, signals from more and more of the signal sources in view are identified. Alternatively, signal sources in view may be identified by supplementary information provided by an assistance server. At $t=t_1>0$, we assume that the receiver 100 has acquired and is capable of tracking four signal sources, namely SV1, SV2, SV3 and SV4. These signal sources are tracked using the first four tracking channel resources T1, T2, T3 and T4 respectively. Typically, it is sufficient to track four signal sources to enable navigation (i.e. derivation of coordinates in three dimensions). Hence, theoretically, the acquisition process could be terminated at this stage.

Nevertheless, according to the invention, the acquisition process continues in search of stronger (or by other means better) signal sources. At $t=t_2>t_1$, we assume that the receiver 100 has acquired and determined respecting tracking-parameter data also for the signal sources SV5, SV6 and SV7. Initially, the tracking channel resources T5 and T6 plus the monitoring channel resource M are used for this purpose. However, when respective tracking-parameter data have been determined regarding the signal sources SV5, SV6 and SV7, the receiver 100 continues to search for any additional signal sources in view. To this aim, for instance, the resources T5, T6 and M are freed, while the receiver 100 records these data to memory, then continues to track the signal sources SV1 to SV4 via the initial four tracking channel resources T1 to T4.

At $t=t_3>t_2$, we assume that the receiver 100 has acquired and has further determined respecting tracking-parameter data for the signal sources SV8, SV9 and SV10 via the resources T5, T6 and M respectively. The search for additional signal sources continues also after $t_3$, however in this case, the search is fruitless. Instead, the receiver 100 instigates an optimization process, which singles out the set of signal sources being optimal with respect to at least one criterion, such as an estimated processing power required to produce the position/time related data $D_{PT}$, geometry considerations regarding the spatial positions of each of the signal sources, or a position constraint specifying an accuracy of the position/time related data $D_{PT}$ producible based on the signals received from the signal sources.

At $t=t_4>t_3$, the optimization process is completed, and we assume that the signal sources SV1, SV2, SV3, SV4, SV8 and SV9 were found to be optimal given the present receiver position/time $PT_R$, the current positions and types of the signal sources and the radio environment in which these and the receiver 100 presently exist. Consequently, the processing unit 135 defines an active set in which the signal sources SV1, SV2, SV3, SV4, SV8 and SV9 are included. Based on the radio signals $S_{HF}$ received from these sources, the receiver produces the time/position data $D_{PT}$.

The remaining signal sources in view, i.e. SV5, SV6, SV7 and SV10 constitute the members of the additional set. According to the invention, as of $t=t_4$, the processing unit 135 is adapted to process the radio signals $S_{HF}$ from the signal sources SV5, SV6, SV7 and SV10 in the additional set according to a cyclic processing sequence σ, which is completed using the monitoring channel resource(s) M. Specifically, the cyclic processing sequence a involves processing signals from a first additional signal source, say SV5, during a first phase ph1. In this processing, the processing unit 135 refreshes tracking-parameter data (e.g. a code-phase measure and a Doppler frequency measure) in respect of the first additional signal source. As mentioned above, the processing unit 135 here preferably also determines a signal-to-noise estimate of this signal source. These two calculations implicitly establish that the source is visible to the receiver.

During a second phase ph2 subsequent to the first phase ph1, the processing unit 135 refreshes tracking-parameter data (and possibly a signal-to-noise estimate) in respect of a second additional signal source, e.g. SV6, and so on, until tracking-parameter data and a signal-to-noise estimates have been determined with regard to all the signal sources in the additional set. Thereafter, the processing unit 135 repeats the sequence σ. Hence, in this example where the additional set includes four signal sources SV5, SV6, SV7 and SV10, and the processing unit 135 has allocated one monitoring channel resource M, the cyclic processing sequence σ has four phases ph1, ph2, ph3 and ph4. For example, if instead two monitoring channel resources had been allocated, the sequence σ would only have had two phases. According to the invention, the monitoring channel resources are adaptive, and preferably the number of channel resources M is selected relative to the additional set $s_{add}$, such that the additional set $s_{add}$ has more members than the number of channel resources M. Thus, the cyclic processing sequence σ will always have at least two phases.

According to one embodiment of the invention, the receiver has a signal-source record 310 in which the signal sources SV1, SV2, SV3, SV4, SV5, SV6, SV7, SV8, SV9 and SV10 in view are listed. The record 310 specifies, for each signal resource, whether the signal resource belongs to the active set $s_{act}$ or the additional set $s_{add}$. The signal-source record 310 includes a set of parameters P1, P2, ..., Pn, which for each of the signal sources specifies tracking-parameter data, the signal-to-noise estimate and ephemeris data describing the signal source's movements over time relative to Earth 200. Moreover, the processing unit 135 is preferably adapted to repeatedly update the set of parameters P1, P2, ..., Pn.

According to one embodiment of the invention, the tracking-parameter data and the signal-to-noise estimate are updated for the signal sources both in the active and the additional sets $s_{act}$ and $s_{add}$ in each updating cycle. However, the ephemeris data is exclusively updated for the signal sources in the active set $s_{act}$.

According to another embodiment of the invention, the processing unit 135 is adapted to repeatedly update the signal-source record 310 over the signal sources in the active and additional sets $s_{act}$ and $s_{add}$ respectively such that:

the signal-to-noise estimate is updated based on radio signals $S_{HF}$ received from the signal sources in both the active and the additional sets $s_{act}$ and $s_{add}$;

at least one of the tracking-parameter data and the ephemeris data for at least one aided signal source in the active or additional sets $s_{act}$ and $s_{add}$ is updated based on radio signals received from an aiding transmitter different from any of the signal sources in the active or additional sets $s_{act}$ and $s_{add}$; and remaining tracking-parameter data and ephemeris data for each signal source other than the at least one aided signal source are updated based on radio signals $S_{HF}$ received from the signal sources in the active and additional sets $s_{act}$ and $s_{add}$ respectively according to the principles outlined above.

The aiding transmitter may for instance be represented by a ground-based radio beacon, which relays or duplicates a subset of signals otherwise transmitted by one or more satellites.

As mentioned previously, the tracking-parameter data may include a Doppler frequency estimate, expressing the shift from the nominal carrier frequency for each observed satellite signal, and a code phase estimate, expressing a relationship between the phase of the modulation signal received from each observed satellite and a locally generated reference ropy of that same modulation signal. Hence, given the tracking-parameter data in respect of a signal source, the receiver 100 may start producing the position/time related data $D_{PT}$ based on the signals received from this source.

Of course, the radio environment in which the signal sources and the receiver 100 operate changes, and sometimes very rapidly. In most cases, these changes are due to motion or repositioning of the signal sources, the receiver 100, and/or one or more objects between the signal sources and the receiver. However, atmospheric variations also influence the radio environment. Therefore, the active and additional sets $s_{act}$ and $s_{add}$ should be updated repeatedly.

According to one embodiment of the invention, the definition of the active set $s_{act}$ is adjustable. Preferably, the processing unit 135 is adapted to effect a transfer of signal sources between the active and additional sets $s_{act}$ and $s_{add}$ in response to a replacement request from a process being external to the processing of the tracking channel resources T1, T2, T3, T4, T5, and T6. The replacement request may be generated due to a discontinuity in the reception of radio signals from one or more signal sources presently included in the active set $s_{act}$. However, the replacement request may also be produced internally if the receiver 100 finds itself unable to track at least one signal from at least one of the signal sources in the active set $s_{act}$.

Furthermore, the replacement request may be caused if one or more of the following requirements are fulfilled:

(i) a first estimated processing power is required to produce the position/time related data $D_{PT}$ based on the radio signals $S_{HF}$ received from the signal sources in the active set $s_{act}$, at least one second estimated processing power is calculated, which reflects the estimated processing power required to produce the position/time related data $D_{PT}$ based on at least one alternative combination of signal sources including at least one signal source from the additional set $s_{add}$, and at least one of the at least one second estimated processing power is lower than the first estimated processing power;

(ii) at least one first geometry parameter reflects a spatial position of each of the signal sources in the active set $s_{act}$, at least one second geometry parameter reflects a spatial position of each of the signal sources in the additional set $s_{add}$, and the relationship between the at least one first and second geometry parameters indicates that it is more advantageous to produce the position/time related data $D_{PT}$ based on at least one alternative combination of signal sources which includes at least one of the signal sources in the additional set $s_{add}$; or (iii) a position constraint is defined, which specifies a lowest acceptable accuracy of the position/time related data $D_{PT}$ produced, and this constraint cannot be met by the radio signals $S_{HF}$ received from the signal sources in the active set $s_{act}$.

According to one embodiment of the invention, the processing unit 135 is specifically adapted to transfer a first number of signal sources from the additional set $s_{add}$ to the active set $s_{act}$, and conversely, transfer the first number of signal sources from the active set $s_{act}$ to the additional set $s_{add}$. Thus, the number of signal sources in the active set $s_{act}$ remains constant. The number of signal sources in the additional set $s_{add}$ is thereby normally also kept constant. However, if for example the transfer is effected due to a discontinuity in the reception of radio signals from one or more signal sources in the active set $s_{act}$, the size of the additional set $s_{add}$ may at least temporarily be reduced thereby. Conversely, the processing unit 135 will not normally have current tracking-parameter data for a satellite that has just risen above the unit's elevation mask. In this case, the processing unit is adapted to transfer a signal source from the active set $s_{act}$ to the additional set $s_{add}$; to include the newly-available signal source in the active set $s_{act}$ using the just-freed tracking resource; and determine current tracking-parameter data for the newly-available signal source in the usual manner. Thus the size of $s_{add}$ may at least temporarily increased as well. Nevertheless, the total number of tracking resources does not change in this case, so the power consumed by the receiver does not substantially increase.

There are yet other situations in which a revision of the active and additional sets $s_{act}$ and $s_{add}$ is appropriate. As mentioned above, the ephemeris data is exclusively updated for the signal sources in the active set $s_{act}$. Hence, it is possible that the ephemeris data becomes dated with respect to the signal sources in the additional set $s_{add}$. Therefore, according to one embodiment of the invention, the processing unit 135 is adapted to, at repeated instances determine, for each signal source in the additional set $s_{add}$, an ephemeris age since the ephemeris data relating to the signal source were issued. If the ephemeris age exceeds a threshold value, the processing unit 135 is further adapted to cause generation of a replacement request, which specifies inclusion into the active set $s_{act}$ of each signal source from the additional set $s_{add}$ whose ephemeris age exceeds the threshold value. By contrast, the ephemeris data for the signal sources in the active set $s_{act}$ is refreshed continuously.

According to another embodiment of the invention, it is presumed that at least one of the signal sources in the additional set $s_{add}$ transmits additional radio signals $S_{HF}$ in a frequency band being different from a main frequency band in which radio signals $S_{HF}$ from the signal sources in the active set $s_{act}$ are received by the receiver 100. For example, the signal sources in the active set $s_{act}$ may transmit radio signals $S_{HF}$ in the L5/E5a-band (a relatively wide band) and the signal sources in the additional set $s_{add}$ may transmit radio signals $S_{HF}$ in the L1-band (a relatively narrow band). The processing unit 135 is here adapted to measure a transmission parameter, which reflects an ionospheric delay between the signal sources and the receiver 100 based on at least one radio signal $S_{HF}$ received from at least one signal source in the active set $s_{act}$ (i.e. here, in the L5/E5a-band) and at least one radio signal $S_{HF}$ received from the at least one signal source in the additional set $s_{add}$ (i.e. here, in the L1-band). Hence, important characteristics of the ionosphere influencing the radio environment in which the receiver operates can be determined at a comparatively low cost in terms of processing power.

According to an alternative, or complementary embodiment of the invention, the processing unit 135 is adapted to resolve real-time-kinematics (RTK) related carrier ambiguities based on at least one radio signal $S_{HF}$ received from at least one signal source in the active set $s_{act}$ (e.g. in the L2-band—relatively wide) and at least one radio signal $S_{HF}$ received from the at least one signal source in the additional set $s_{add}$ (e.g. in the L1-band—relatively wide). As a result, high-precision navigation can be accomplished at very moderate processing intensity.

In a GNSS it is not uncommon that one satellite includes equipment for transmitting signals on more than one frequency band, for example represented by two transmitter chains implemented in a common unit. Thus, in both the above-described embodiments it is possible (and in certain applications preferable) that a first signal being transmitted on a first frequency band from a satellite is included in the active set $s_{act}$, while a second signal from the same satellite transmitted on a second frequency band is included in the additional set $s_{add}$.

Figure 4:
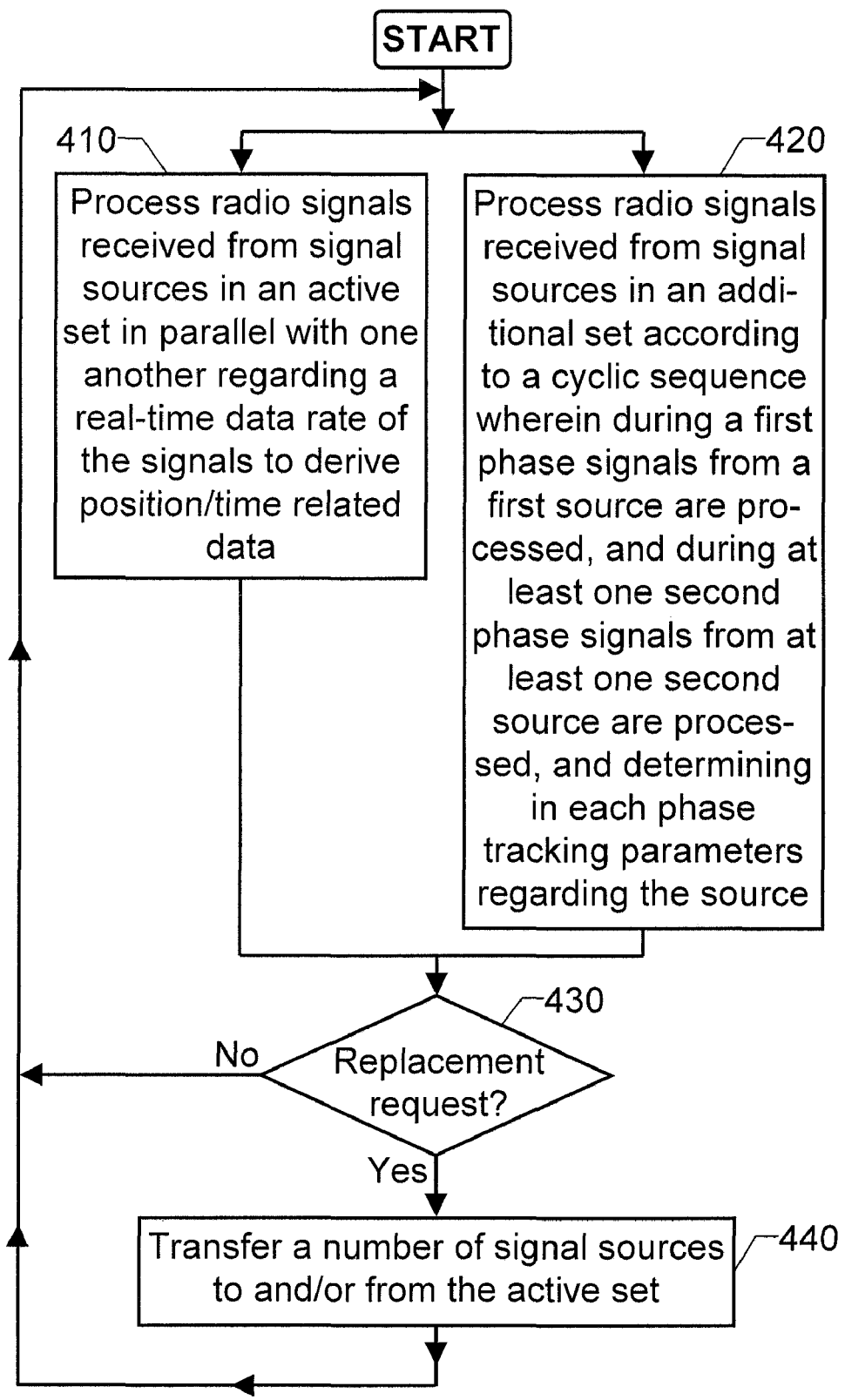
FIG. 4 illustrates, by means of a flow diagram, a general method of operating a GNSS receiver according to a preferred embodiment of the invention.

To sum up, we will now describe the method of controlling a GNSS receiver according to a preferred embodiment of the invention with reference to the flow diagram in FIG. 4.

An initial step 410 processes radio signals transmitted from an active set of signal sources in a radio signal processing unit, such that position/time related data is produced. Here, the signals are processed in parallel with respect to a real-time signal data rate of the signals by a respective tracking channel resource in the processing unit that is allocated for each signal source in the active set.

Another step 420, executed in parallel with step 410, processes radio signals transmitted from each of at least two signal sources in an additional set via at least one monitoring channel resource in the radio signal processing unit. The additional set includes signal sources different from the signal sources in the active set. Moreover, the signals from the sources in the additional set are processed according to a cyclic processing sequence, which involves the following: during a first phase of the sequence signals from a first additional signal source are processed; and during at least one second phase of the sequence signals from at least one second additional signal source are processed. In each of these phases, a respective set of parameters is determined regarding the radio signals received from one signal source in the additional set. The set of parameters thus determined include tracking-parameter data, such that based thereon, tracking of one or more of the signal sources in the additional set can be instigated momentarily.

The proposed method encompasses steps 410 and 420, however according to a preferred embodiment of the invention, these steps are succeeded by a step 430, which investigates whether or not a replacement request in respect of at least one signal source in the active and/or additional set has been received. If so a step 440 follows, otherwise the procedure loops back to steps 410 and 420.

Step 440 transfers at least one signal source to and/or from the active set. Thereafter, the procedure loops back to steps 410 and 420.

All of the steps, as well as any sub-sequence of steps, described with reference to FIG. 4, above may be controlled by means of a programmed computer apparatus. Moreover, although the embodiments of the invention described above with reference to the drawings comprise computer apparatus and processes performed in computer apparatus, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the procedure according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc), an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant procedures.

The term "comprises/comprising" when used in this specification is taken to specify the presence of stated features, integers, steps or components. However, the term does not preclude the presence or addition of one or more additional features, integers, steps or components or groups thereof.

The reference to any prior art in this specification is not, and should not be taken as, an acknowledgement or any suggestion that the referenced prior art forms part of the common general knowledge in Australia.

The invention is not restricted the described embodiments in the figures, but may be varied freely within the scope of the claims.

The invention claimed is:

1. A global navigation satellite system (GNSS) receiver, comprising:
a radio signal processing unit adapted to process radio signals transmitted from an active set of signal sources and based thereon produce position/time related data, the signals being processed in parallel with respect to a real-time signal data rate of the signals by a respective tracking channel resource allocated for each signal source in the active set, wherein the processing unit comprises at least one monitoring channel resource adapted to process radio signals transmitted from each of at least two signal sources in an additional set of signal sources different from the signal sources in the active set, and the processing unit is adapted to process the radio signals from the signal sources in the additional set according to a cyclic processing sequence involving:
processing signals from a first additional signal source during a first phase of the sequence,
processing signals from at least one second additional signal source during at least one second phase of the sequence, and
determining in each of said phases a respective set of parameters regarding the radio signals received from one signal source in the additional set, the set of parameters comprising tracking-parameter data.

2. A GNSS receiver according to claim 1, wherein the set of parameters comprises a signal-to-noise estimate.

3. A GNSS receiver according to claim 1, wherein the tracking-parameter data comprises:
a code-phase measure relating to an offset of a spreading code characterizing a given signal source,
Doppler frequency estimate expressing a shift from a nominal carrier frequency for each signal source, and
a code phase estimate expressing a relationship between a phase of a modulation signal received from each observed signal source and a locally generated reference copy of that same modulation signal.

4. A GNSS receiver according to claim 1, wherein the processing unit is adapted to:
transfer a first number of signal sources from the additional set to the active set, and
transfer the first number of signal sources from the active set to the additional set.

5. A GNSS receiver according to claim 4, wherein the processing unit is adapted to effect the transfer of signal sources between the active and additional sets in response to a replacement request from a process being external to the processing of the tracking channel resources.

6. A GNSS receiver according to claim 5, wherein the replacement request is based on at least one of:
an estimated processing power required to produce the position/time related data based on the radio signals received from the signal sources in the active set and based on the signal sources in the additional set respectively,
at least one geometry parameter reflecting a spatial position of each of the signal sources in the active set and each of the signal sources in the additional set,
a position constraint specifying a lowest acceptable accuracy of the position/time related data produced based on the signals received from the signal sources in the active set,
a discontinuity in the reception of radio signals from at least one of the signal sources in the active set, and
a tracking failure in respect of at least one signal received from at least one of the signal sources in the active set.

7. A GNSS receiver according to claim 2, wherein the receiver comprises a signal-source record over the signal sources in the active and additional sets, the signal-source record comprising a set of parameters which for each of the signal sources specifies tracking-parameter data, a signal-to-noise estimate and ephemeris data describing the signal source's movements over time relative to Earth, and the processing unit is adapted to repeatedly update:
the tracking-parameter data, the signal-to-noise estimate and the ephemeris data based on radio signals received from the signal sources in the active set, and
the tracking-parameter data and the signal-to-noise estimate on radio signals received from the signal sources in the additional set.

8. A GNSS receiver according to claim 2, wherein the receiver comprises a signal-source record over the signal sources in the active and additional sets, the signal-source record comprising a set of parameters which for each of the signal sources specifies tracking-parameter data, a signal-to-noise estimate and ephemeris data describing the signal source's movements over time relative to Earth, and the processing unit is adapted to repeatedly update:
the signal-to-noise estimate based on radio signals received from the signal sources in the active or additional sets,
at least one of the tracking-parameter data and the ephemeris data for at least one aided signal source in the active or additional sets based on radio signals received from an aiding transmitter different from any of the signal sources in the active or additional sets, and
remaining tracking-parameter data and ephemeris data for each signal source other than the at least one aided signal source based on radio signals received from the signal sources in the active and additional sets.

9. A GNSS receiver according to claim 7, wherein the processing unit is adapted to:
determine at repeated instances, for each signal source in the additional set, an ephemeris age since the ephemeris data relating to the signal source were issued, and if the ephemeris age exceeds a threshold value,
cause generation of a replacement request specifying inclusion into the active set of each signal source from the additional set whose ephemeris age exceeds the threshold value.

10. A GNSS receiver according to claim 1, wherein at least one of the signal sources in the additional set transmits radio signals in a secondary frequency band being different from a main frequency band in which radio signals from the signal sources in the active set are received by the receiver, and the processing unit is adapted to measure a transmission parameter reflecting an ionospheric delay between the signal sources and the receiver based on at least one radio signal received in the main frequency band from at least one signal source in the active set and at least one radio signal received in the secondary frequency band from the at least one signal source in the additional set.

11. A GNSS receiver according to claim 1, wherein at least one of the signal sources in the additional set transmits radio signals in a secondary frequency band being different from a main frequency band in which radio signals from the signal sources in the active set are received by the receiver, and the processing unit is adapted to resolve real-time-kinematics related carrier ambiguities based on at least one radio signal received in the main frequency band from at least one signal source in the active set and at least one radio signal received in the secondary frequency band from the at least one signal source in the additional set.

12. A GNSS receiver according to claim 1, wherein the signal processing unit is at least partly implemented in software running on a processor.

13. A method of operating a global navigation satellite system (GNSS) receiver that includes a radio signal processing unit adapted to process radio signals transmitted from an active set of signal sources and based thereon produce position/time related data, the method comprising:
  processing the signals in parallel with respect to a real-time signal data rate of the signals by a respective tracking channel resource allocated for each signal source in the active set;
  processing, in at least one monitoring channel resource, radio signals transmitted from each of at least two signal sources in an additional set of signal sources different from the signal sources in the active set according to a cyclic processing sequence involving:
  processing signals from a first additional signal source during a first phase of the sequence,
  processing signals from at least one second additional signal source during at least one second phase of the sequence, and
  determining in each of said phases a respective set of parameters regarding the radio signals received from one signal source in the additional set, the set of parameters comprising tracking-parameter data.

14. A method according to claim 13, wherein the set of parameters comprises a signal-to-noise estimate.

15. A method according to claim 13, wherein the tracking-parameter data comprising:
  a code-phase measure relating to an offset of a spreading code characterizing a given signal source,
  Doppler frequency estimate expressing a shift from a nominal carrier frequency for each signal source, and
  a code phase estimate expressing a relationship between a phase of a modulation signal received from each observed signal source and a locally generated reference copy of that same modulation signal.

16. A method according to claim 14, comprising:
  transferring a first number of signal sources from the additional set to the active set, and
  transferring the first number of signal sources from the active set to the additional set.

17. A method according to claim 16, comprising effecting the transfer of signal sources between the active and additional sets in response to a replacement request from a process being external to the processing of the tracking channel resources.

18. A method according to claim 17, wherein the replacement request being based on at least one of:
  an estimated processing power required to produce the position/time related data based on the radio signals received from the signal sources in the active set and based on the signal sources in the additional set respectively, at least one geometry parameter reflecting a spatial position of each of the signal sources in the active set and each of the signal sources in the additional set,
  a position constraint specifying a lowest acceptable accuracy of the position/time related data produced based on the signals received from the signal sources in the active set,
  a discontinuity in the reception of radio signals from at least one of the signal sources in the active set, and
  a tracking failure in respect of at least one signal received from at least one of the signal sources in the active set.

19. A method according to claim 14, wherein the receiver comprising a signal-source record over the signal sources in the active and additional sets, the signal-source record comprising a set of parameters which for each of the signal sources specifies tracking-parameter data, a signal-to-noise estimate and ephemeris data describing the signal source's movements over time relative to Earth, and the method comprising repeatedly updating:
  the tracking-parameter data, the signal-to-noise estimate and the ephemeris data based on radio signals received from the signal sources in the active set, and
  the tracking-parameter data and the signal-to-noise estimate on radio signals received from the signal sources in the additional set.

20. A method according to claim 14, wherein the receiver comprising a signal-source record over the signal sources in the active and additional sets, the signal-source record comprising a set of parameters which for each of the signal sources specifies tracking-parameter data, a signal-to-noise estimate and ephemeris data describing the signal source's movements over time relative to Earth, and the method comprising repeatedly updating:
  the signal-to-noise estimate based on radio signals received from the signal sources in the active or additional sets,
  at least one of the tracking-parameter data and the ephemeris data for at least one aided signal source in the active or additional sets based on radio signals received from an aiding transmitter different from any of the signal sources in the active or additional sets, and
  remaining tracking-parameter data and ephemeris data for each signal source other than the at least one aided signal source based on radio signals received from the signal sources in the active and additional sets.

21. A method according to claim 19, comprising:
  determining at repeated instances, for each signal source in the additional set, an ephemeris age since the ephemeris data relating to the signal source were issued, and if the ephemeris age exceeds a threshold value,
  causing generation of a replacement request specifying inclusion into the active set of each signal source from the additional set whose ephemeris age exceeds the threshold value.

22. A method according to claim 13, wherein at least one of the signal sources in the additional set transmitting radio signals in a secondary frequency band being different from a main frequency band in which radio signals from the signal sources in the active set are received by the receiver, and method comprising deriving a transmission parameter reflecting an ionospheric delay between the signal sources and the receiver based on at least one radio signal received in the main frequency band from at least one signal source in the active set and at least one radio signal received in the secondary frequency band from the at least one signal source in the additional set.

23. A method according to claim 13, wherein at least one of the signal sources in the additional set transmitting radio signals in a secondary frequency band being different from a main frequency band in which radio signals from the signal sources in the active set are received by the receiver, and the method comprising resolving real-time-kinematics related carrier ambiguities based on at least one radio signal received in the main frequency band from at least one signal source in the active set and at least one radio signal received in the secondary frequency band from the at least one signal source in the additional set.

24. A system comprising a memory containing software for controlling the steps of claim 13 when said program is run on the system.

25. A non-transitory computer readable storage medium, having a program recorded thereon, wherein the program is to make a computer control the steps of claim 13 when the program is loaded into the computer.

* * * * *